United States Patent [19]

Combe et al.

[11] Patent Number: 5,048,951
[45] Date of Patent: Sep. 17, 1991

[54] LASER ANEMOMETER WITH SEVERAL MEASUREMENT DIRECTIONS

[75] Inventors: Hubert Combe; Bertrand Morbieu, both of Valence, France

[73] Assignee: Sextan Avionique, Valence Cedex, France

[21] Appl. No.: 449,208

[22] Filed: Dec. 12, 1989

[30] Foreign Application Priority Data

Dec. 15, 1988 [FR] France .............................. 88 16534

[51] Int. Cl.$^5$ .............................................. G01P 3/36
[52] U.S. Cl. .................. 356/28.5; 359/201; 359/220
[58] Field of Search ................ 350/6.5, 6.9, 6.91, 350/28.5, 5

[56] References Cited

U.S. PATENT DOCUMENTS

3,984,685 10/1976 Fletcher et al. ................. 356/28.5
4,733,072 3/1988 Lettington .......................... 356/5

FOREIGN PATENT DOCUMENTS

0009533 8/1980 European Pat. Off. .
0112188 6/1984 European Pat. Off. .

*Primary Examiner*—Stephen C. Buczinski
*Attorney, Agent, or Firm*—Lowe, Price, LeBlanc, Becker & Shur

[57] ABSTRACT

A laser anemometer with several measurement directions is disclosed, in which an incident beam (3) is intercepted by two disks (91, 92) having a common axis which are driven in rotation about this axis. The two disks are provided with transparent and reflecting sectors arranged so that the incident beam successively follows three different paths (3x, 3y, 3z). The axis common to the two disks intersects the axis of the incident beam (3). Mirrors reflect the directed beam in mutually orthogonal directions defining a three-dimensional orthogonal reference system in which the three components of the speed may be successively measured. The anemometer of the invention is particularly suitable for the measurement of the three components of the speed of an aircraft with respect to still air.

13 Claims, 5 Drawing Sheets

LASER ANEMOMETER WITH SEVERAL MEASUREMENT DIRECTIONS

FIELD OF THE INVENTION

This invention relates to a laser anemometer for measuring the speed of movement of an assembly of particles in suspension in the air.

BACKGROUND OF THE PRIOR ART

When it is mounted in an aircraft, such an anemometer measures the speed of movement of the still air relative to the aircraft, at a distance, i.e. the speed of the aircraft itself with respect to the still air. Its operating principle is based on the phenomenon known by the "Doppler effect".

Anemometers of the above defined type are already known, which do not comprise means for moving the incident beam in space or comprise a continuous conical scanning system.

For a fixed beam anemometer, the volume in which the relative speed of the particles is measured is an elongate volume extending substantially along the axis of the incident beam and it is in fact the projection of the relative speed along this axis which is measured. The information delivered by such an anemometer is therefore partial, since it relates to only one component of the relative speed to be measured.

To partly overcome this disadvantage, means may be provided for varying the direction of the incident beam. For example, it is known to use a prism intercepting the incident beam and mounted for pivoting about an axis perpendicular to its input face, which axis merges with the axis of the incident beam. At rest, the incident beam is therefore deviated by the prism. When the prism is rotated, the incident beam scans a cone, which makes it possible to make measurements in different directions. However, the half angle at the apex of the scanned cone remains small. The result is that the accuracy obtained on the transverse components of the relative speed is low. In addition, the measurement of the speed in a given direction is not instantaneous. It is therefore necessary either to drive the prism intermittently, leaving it stopped during each measurement, or to drive it continuously, but at a fairly slow speed. In both cases, that involves a compromise between the rapidity and the accuracy of the measurements. Moreover, such an anemometer is not very easy to install in an aircraft, to the extent that, if it cannot be installed at the end of the nose of the aircraft, a window transparent to the laser beam would have to be provided in the form of a vertical ring going right round the fuselage, so as to let the laser beam pass through which scans the cone with a substantially horizontal axis. This does not seem reasonably possible.

SUMMARY OF THE DISCLOSURE

The object of the present invention is to overcome the above-identified drawbacks by providing an anemometer making possible rapid and accurate measurements in different directions, which may form appreciable angles therebetween, so as to know with high accuracy all the components of the speed, this anemometer being easy to install in an aircraft.

For this, the present invention provides an anemometer of the above defined type, characterized by the fact that:

means for varying the direction of said incident beam comprise means for intercepting said incident beam, which are partially transparent and partially reflecting, and driven with a continuous movement so as to move, in a fixed plane, perpendicularly to said incident beam at the point of interception, said incident beam consequently following at least two successive paths, and means provided for controlling said measuring means and the movement of said interception means so that at least one measurement is made while said incident beam follows each of said successive paths.

With the according to a preferred embodiment of the invention, components of the speed can be measured in at least two directions. In fact, although the movement of the interception means is continuous, the changes of direction of the incident beam are abrupt and the direction thereof remains fixed between two changes, because the movement always takes place in the same fixed plane. Because this movement in addition takes place perpendicularly to the incident beam, this movement introduces no disturbance in the measurements. If it were not so, i.e. if the movement of the interception means seen by the incident beam had a component parallel to the axis of the beam, this component would, following the Doppler effect, create a parasite frequency due to backscatter from the optics forming the interception means. In the anemometer of the invention, the incident beam after reaching the interception means follows several successive discrete paths in given directions. By controlling the movement of the interception means at a speed such that the time during which the incident beam follows one of the paths is substantially equal to the time required for making a measurement, it is then possible to rapidly make accurate measurements, since the beam remains fixed during the time taken for a particular measurement.

Because the directions of the successive paths followed by the incident beam are fixed, the installation of the anemometer of the invention in the nose of the aircraft is facilitated. In fact, it is sufficient to provide two, or three, windows in the fuselage, depending on whether the successive directions of the paths are two in number, or respectively three, for letting the incident beam pass therethrough. That is much more realistic than a single window in the form of a ring around the fuselage.

Advantageously, in a preferred embodiment of this invention said interception means comprise at least a first disk whose axis intercepts the axis of said incident beam, said disk being driven in continuous rotation about its own axis and being provided with at least a first transparent sector and at least a first reflecting sector.

In this case, the form of construction is particularly simple, since the changes of path of the incident beam are obtained by reflection from or passage through respectively reflecting or transparent sectors of a disk driven in continuous rotation. It is important to note the characteristic in which the axis of the rotating disk intercepts the axis of the incident beam. It is in fact thanks to this characteristic that the movement of the surface of the disk, in the vicinity of the point where it intercepts the incident beam, is perpendicular to the axis of the incident beam.

Advantageously, said first transparent sector is of 240° magnitude, said first reflecting sector is of 120° magnitude and a second disk is provided having the same axis as the first disk and fixed thereto, which intercepts said incident beam after it has passed through said first transparent sector, the second disk having a second transparent sector of 120° magnitude and a second reflecting sector of 120° magnitude which faces said first transparent sector, said incident beam consequently following three successive paths.

In this case, the incident beam follows three successive paths, during periods which are equal to each other and equal to a third of the period of rotation of the disks. Using reflecting mirrors, it is easy to direct these three paths in the direction the respective directions of the three axes of a reference system, inside which the three components of the speed to be measured are thus measured successively.

Advantageously, said first and second disks are the two bases of a cylinder made from a material transparent to the wavelength of said laser, said first and second reflecting sectors being obtained by depositing a reflecting material layer on said bases.

With such an embodiment, a rigorous parallelism between the two disks may be obtained in a simple way.

Again advantageously, reflecting means are provided in each of said successive paths of the incident beam for directing them in orthogonal directions two-by-two. The reference system, in this case, is a tridirectional reference system.

BRIEF DESCRIPTION OF THE DRAWING

The present invention will be better understood from the following description of the preferred embodiment and one of its variants of the anemometer of the invention with reference to the accompanying drawings in which.

DESCRIPTION OF THE PREFERRED EMBODIMENTS

Figure 1:
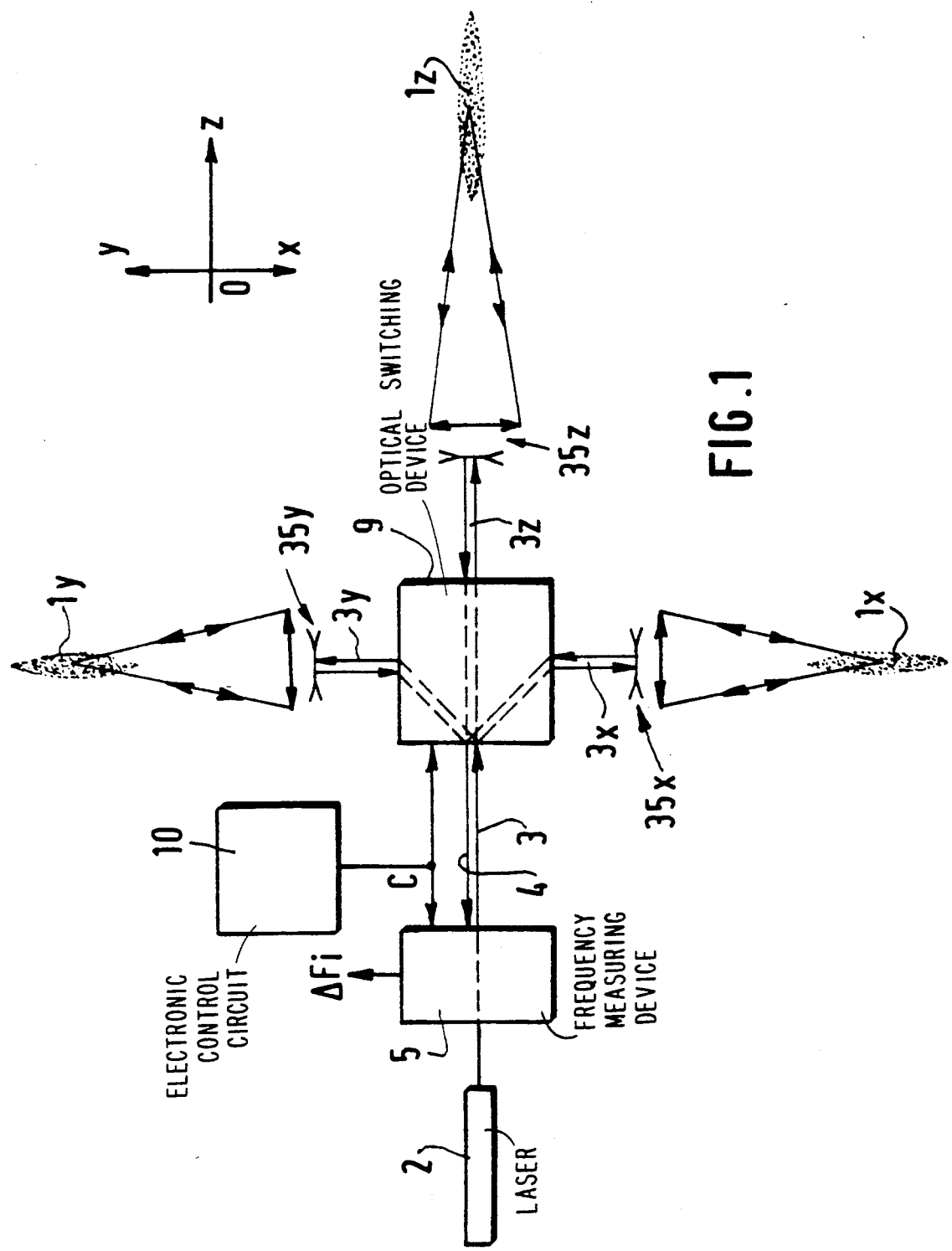
FIG. 1 is a block diagram schematically illustrating the anemometer of the invention.

Referring to FIG. 1, a laser anemometer will now be described. This anemometer is carried on board an aircraft, such as an aeroplane or a helicopter, for measuring, at a distance, the speed of movement of a volume of air relatively to the aircraft. If the distance between the aircraft and a volume of still air outside it is sufficient, this speed is the relative speed of the aircraft with respect to still air, i.e., air undisturbed by the passage of the aircraft. The knowledge of this speed is useful, particularly for piloting the aircraft.

In practice, using the Doppler effect, the anemometer measures the speed of small particles that are in suspension in the volume of air with respect to which the aircraft's whose speed is to be measured.

For this, it comprises a laser 2 transmitting an incident beam 3. Laser 2 preferably is a $CO_2$ laser transmitting infrared radiation of a wavelength of 10.6 microns.

After passing through a frequency measuring device 5, which will be better understood hereafter, the incident beam 3 penetrates into a device 9 for varying its direction.

Device 9 for varying the direction of the incident beam 3 will be better described hereafter. However, we may already consider it as an optical switching device which causes the incident beam 3 to follow successively several different paths. These paths are here the paths 3x, 3y and 3z, parallel to the three axes of a tridirectional axis system Oxyz. In FIG. 1, the axis Oz is parallel to the plane of the figure, whereas the axes Ox and Oy should be understood to form with respect to this plane angles of 45° and 135°, respectively, so that Ox, Oy and Oz are mutually orthogonal.

When the incident beam 3 follows the path 3x, for example, it meets an optical system 35x for focussing on a volume of air containing particles 1x in suspension. The optical system 35x comprises, in a way known per se, a divergent system followed by a convergent system, adapted so that the selected volume is a fairly elongate ellipsoid disposed along the extension of path 3x, at a given distance from the optical system 35x.

The particles 1x partially reflect the incident beam 3, which gives rise to a reflected beam 4 which follows the same path as the incident beam 3, but in the opposite direction.

In a way known per se, and because of the Doppler effect, the frequency of the reflected beam 4 differs from that of the incident beam 3 by an amount, known as a frequency deviation, induced by the component along Ox of the speed of movement of particles 1x. The value of this frequency deviation, ΔFx, is given by equal to:

$$\Delta Fx = 2Vx/\lambda$$

Vx being the component along Ox of the speed of particles 1x and λ being the wavelength of the radiation of the incident beam.

The measuring device 5 makes it possible to measure the frequency deviation ΔFx between the reflected beam 4 and the incident beam 3.

Along paths 3y and 3z are disposed similar optical systems 35y and 35z, respectively focussed on particle volumes 1y and 1z.

An electronic circuit 10, through a signal C, controls the optical switching device so that the incident beam 3 follows successively the paths 3x, 3y and 3z, and so on. The electronic circuit 10 also controls the measuring device 5 so that a measurement is made of each of the frequency deviations ΔFx, ΔFy and ΔFz obtained while the incident beam follows each of the paths 3x, 3y and 3z, respectively. Thus, the three components Vx, Vy and Vz of the speed V to be measured are measured successively. The time required for the measuring device to make a measurement such as ΔFx is of the order of 16 ms.

Figure 2:
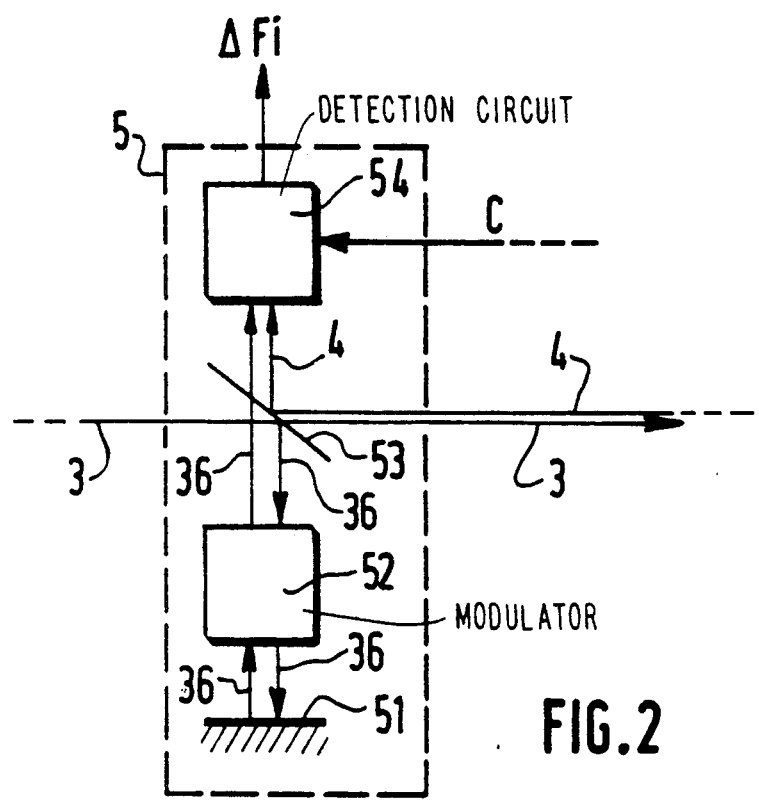
FIG. 2 is a detailed diagram of the measuring device of the anemometer of FIG. 1.

Referring now to FIG. 2, the measuring device 5 comprises, in a way known per se, and disposed in this order perpendicularly to the incident beam 3, a mirror 51, an acoustic-optical modulator 52, a semi-reflecting mirror 53 intercepting the incident beam 3 and a detection circuit 54.

The semi-reflecting mirror 53 reflects a part of the incident beam 3, of frequency $F_I$, towards the acoustic-optical modulator 52 and the mirror 51. The acoustic-optical modulator 52 comprises a piezoelectric transducer excited at a frequency $F_M$ and mirror 51 is disposed so as to reflect back the portion 36 of the reflected part of beam 3 which has passed through modulator 52. Thus, after passing through the modulator 52 a second time, this portion 36 of twice-reflected incident beam 3 comprises particularly the frequency $F_{OL}$, where:

$$F_{OL} = F_I + 2F_M \qquad (2)$$

This portion 36 is received by the detection circuit 54 which also receives, reflected by the semi-reflecting mirror 53, the reflected beam 4 which has a frequency:

$$F_R = F_I + \Delta Fi \qquad (3)$$

with i = x, y or z.

The detection circuit 54 comprises, in a way known per se, an infrared sensitive photodiode followed by filtering and processing circuits for measuring frequency the difference:

$$F_{OL} - F_R = 2F_M - Fi$$

It will be noted that, in a way known per se, the acoustic-optical modulator 52, at the origin of the term $2 F_M$ makes it possible to determine the sign of the frequency deviation $\Delta Fi$. Circuit 54 delivers a signal representative of the deviation $\Delta Fi$, and hence velocity component Vi.

Figure 3:
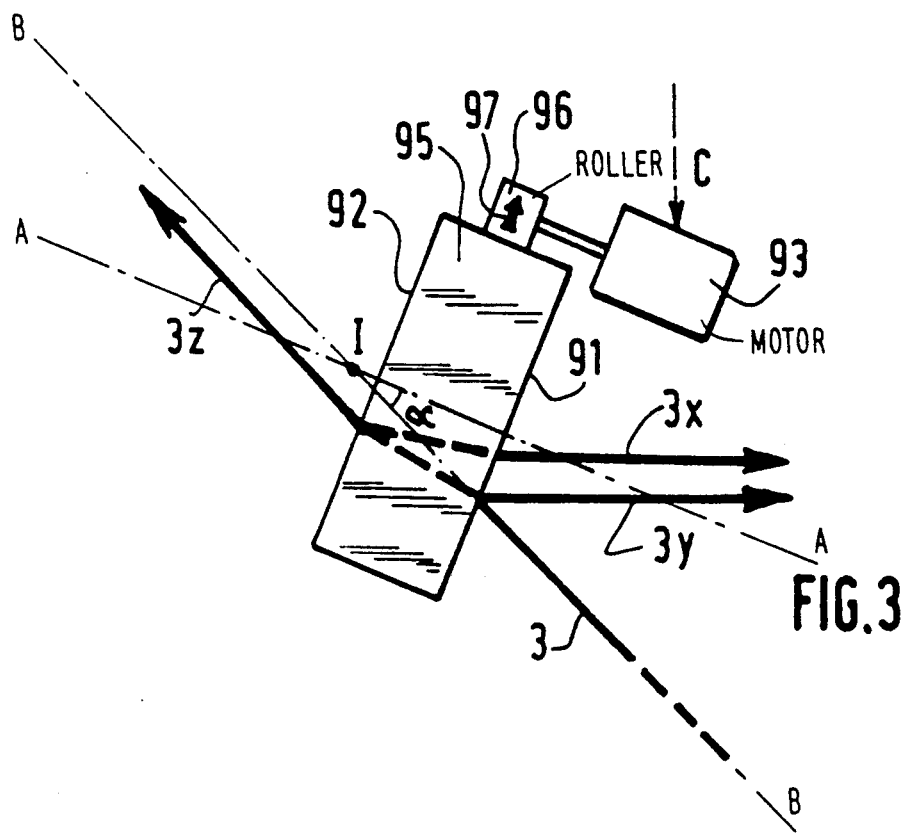
FIG. 3 is a side view of the rotating disks used in the device for varying the direction of the incident beam of the anemometer of FIG. 1.

Referring to FIG. 3, the mobile part of the optical switching device 9 will now be described. It comprises a circular cylinder 95 made from a material transparent to the wavelength of beam 3, for example germanium or zinc selenide. Cylinder 95 is mounted to be rotatable about its own axis A—A and is rotated by a motor 93 which is controlled by the signal C, through a roller 96. The axis A—A of cylinder 95 intersects the axis B—B of the incident beam 3 at a point I, disposed here downstream of the point where the cylinder intercepts the incident beam 3. The two axes A—A and B—B here form an intersection angle $\alpha$ preferably approximately equal to 30°.

Figure 5:
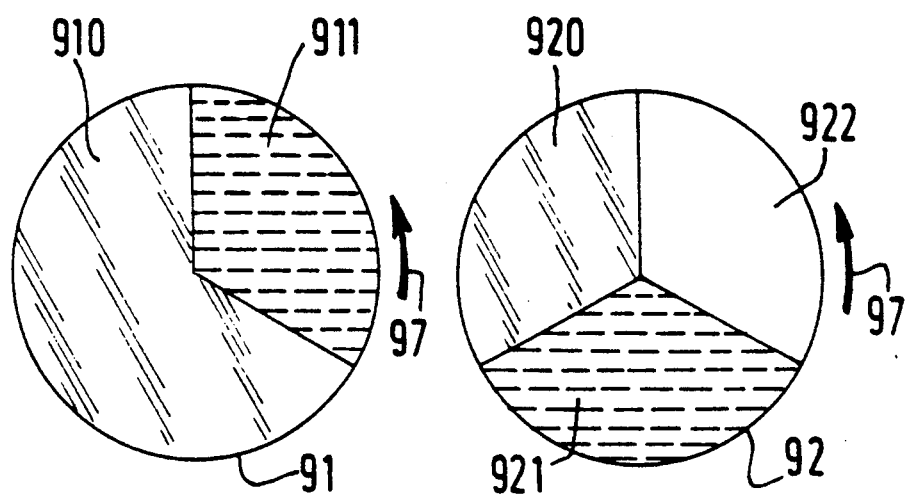
FIG. 5 shows the arrangement of the transparent and reflecting sectors in the rotating disks of FIGS. 3 and 4.

The two bases 91 and 92 of cylinder 95 each comprise, as shown in FIG. 5, a reflecting sector 911 and 921, respectively, and a transparent sector 910 and 920, respectively. The reflecting sectors 911 and 921, of 120°, are obtained by depositing a thin layer of reflecting material on the bases 91 and 92, respectively. The transparent sectors 910 and 920, of 240° and 120° magnitude respectively, have undergone a blooming treatment.

It may be understood that the faces 91 and 92 of the cylinder form two disks with a common axis A—A which are secured together. Disk 91 is the one which first intercepts the incident beam 3 and disk 92 intercepts this incident beam 3 only after it has passed through the transparent sector 910 of disk 91. The transparent sector 920 and the reflecting 921 sector of disk 92 are disposed so as to face the transparent sector 910 of disk 91. The nature of sector 922, of 120°, which faces the sector 911, is immaterial. The result of the above arrangement is that, for a first one-third of a revolution of cylinder 95 during which the reflecting sector 911 intercepts the incident beam 3, the incident beam 3 is immediately reflected from reflecting sector 911 and follows a first path 3y. Then, during the other two-thirds of the revolution of cylinder 95, during which the reflecting sector 910 lets the incident beam 3 pass through, this beam penetrates cylinder 95 and is intercepted by disk 92.

During the second third of the same revolution, considering the direction of rotation shown by arrows 97 in FIG. 5, beam 35 is intercepted by the reflecting sector 921, and it finally leaves cylinder 95, through face 91, along path 3x parallel to path 3y but separate therefrom, since the axis of the incident beam 3 is slanted relatively to the axis of cylinder 95. This is best understood with reference to FIG. 5.

During the last third of the same revolution, the transparent sector 920 lets beam 3 pass through, and this beam which leaves cylinder 95 through face 92 and therefore follows path 3z.

The incident beam 3 therefore follows successively the three separate paths 3y, 3x and 3z, here in this order. Cylinder 95 is driven at 20 revolutions per second. Thus, each path is followed for the 16 ms required for the measurement.

Such as they appear in FIG. 3, the paths 3x, 3y and 3z, although they are separate, are not directed in directions that are necessarily favourable to the measurement of several components of the speed, since the paths 3x and 3y are parallel and form an angle of substantially 120° with the path 3z. Referring to FIGS. 6, 7, 8 and 9, an arrangement of mirrors 31x, 32x, 31y, 32y, 31z and 32z will now be described which allows the three paths 3x, 3y and 3z to be directed in mutually orthogonal directions Ox, Oy and Oz, therefore making it possible to measure the three components of the speed in a tridirectional orthogonal reference system.

Figure 6:
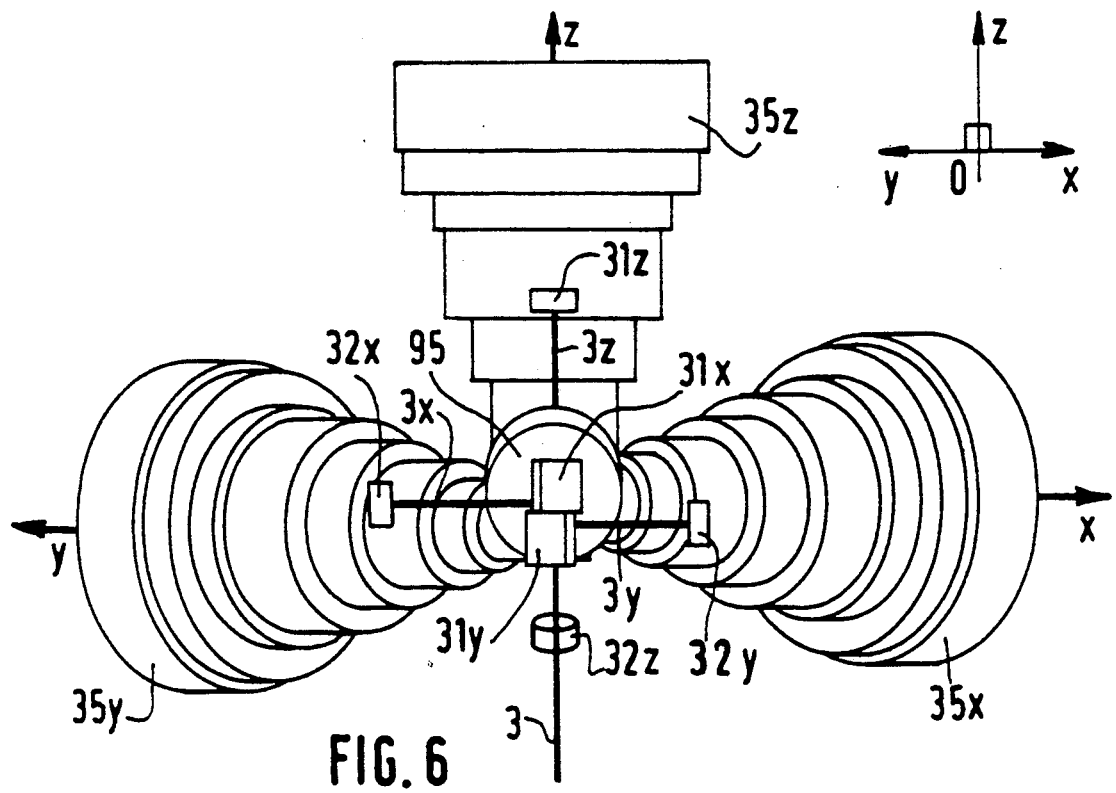
FIG. 6 is a front view of the device for varying the direction of the incident beam of the anemometer of FIG. 1.

FIG. 6 shows a front view of the device 9 for switching the incident beam, shown as a whole. In FIG. 6, axis Oz is vertical to the plane of the figure and it is directed upwards; axis Ox is horizontal, forms an angle of 45° with the plane of the figure and is directed towards the right away from the plane of the figure; and axis Ox is horizontal, and form an angle of 135° with the plane of the figure and is directed leftwards away from the plane of the figure.

Figure 7:
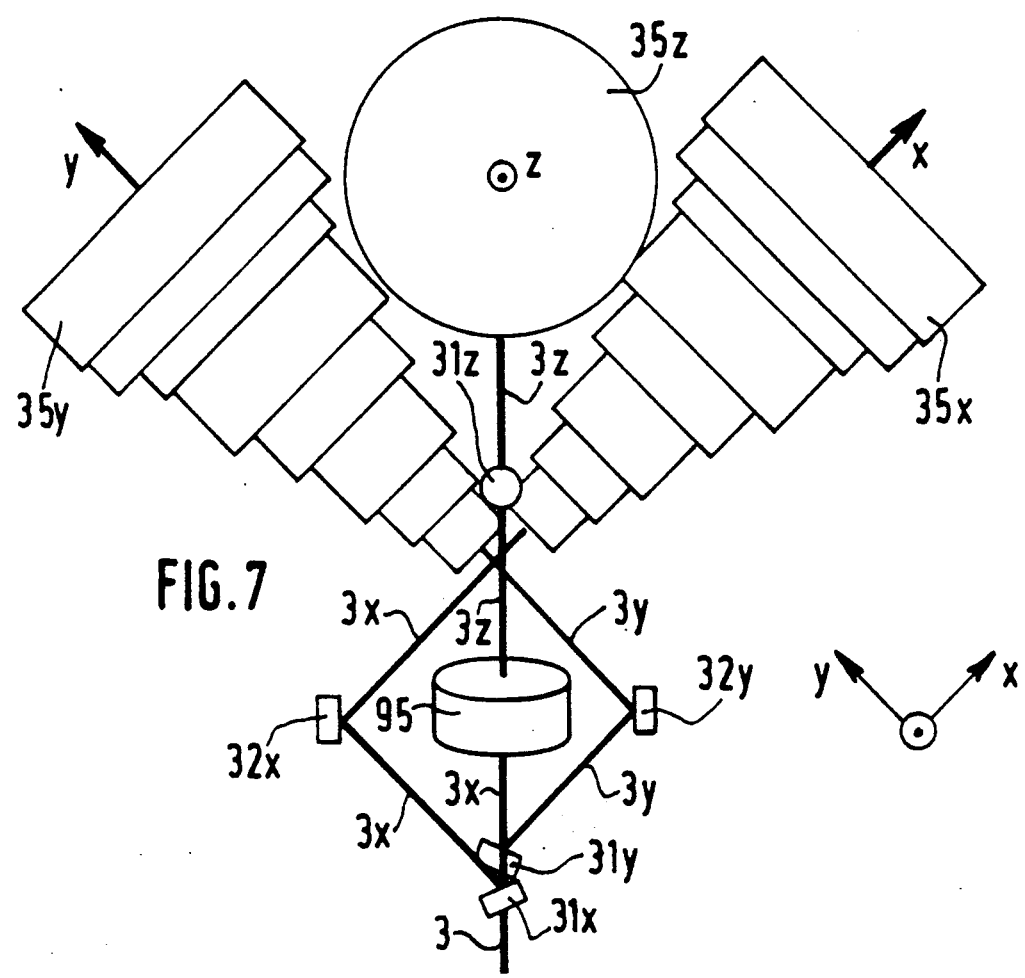
FIG. 7 is a top view of the device of FIG. 6.
Figure 8:
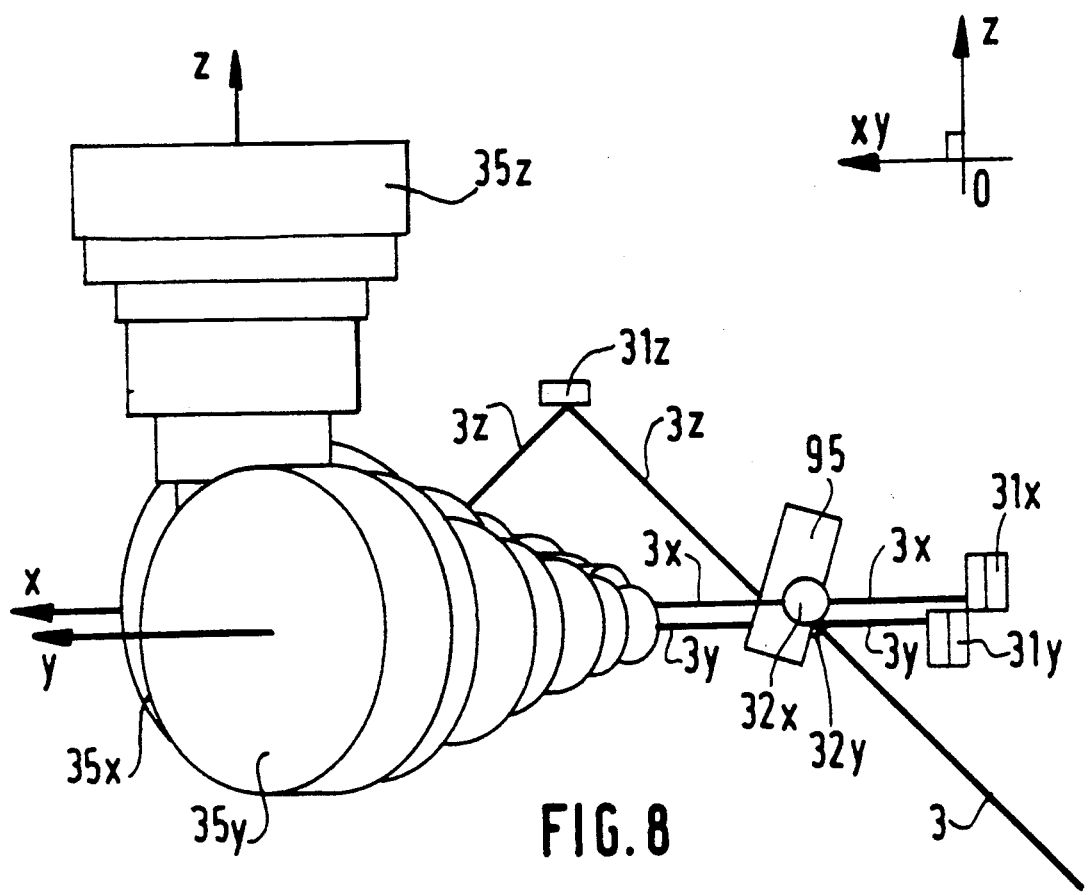
FIG. 8 is a left-hand perspective view of the device of FIG. 6.
Figure 9:
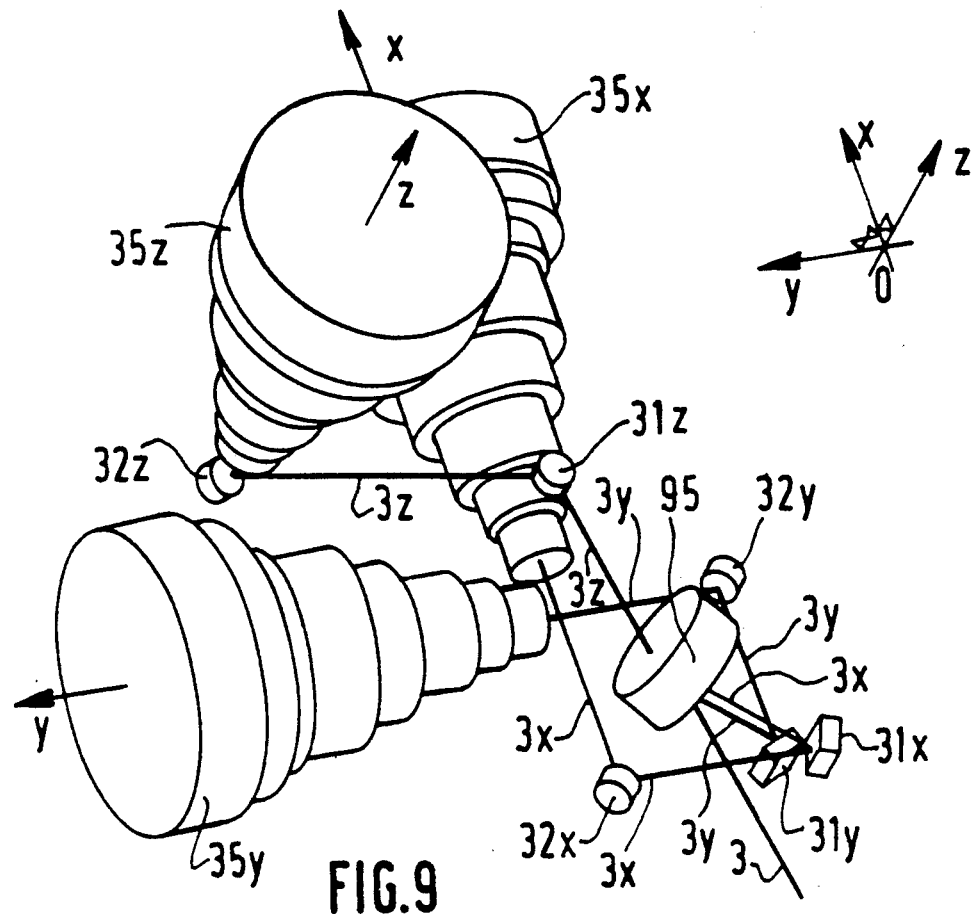
FIG. 9 is a perspective view of the device of FIG. 6.

FIG. 7 and FIG. 8 are, respectively, a top view and a left-hand view of the device of FIG. 6, whereas FIG. 9 is a perspective view from a point of view situated "at the left" and "above", these expressions having the same meaning as for FIGS. 7 and 8.

In FIG. 8, the incident beam 3 and cylinder 95 are shown in the position they occupy in FIG. 3, where the paths 3x and 3y are horizontal on leaving cylinder 35 and parallel to the plane of the figure.

Path 3x is first of all directed by a mirror 31x in the direction Oy, then by a mirror 32x in direction Ox, as shown in FIG. 7. It then penetrates into the focussing optical system 35x, the principle of which has already been described.

Path 3y is parallel to path 3x but is shifted downwards in FIG. 8, and on leaving cylinder 95 is first of all directed by a mirror 31y in direction Ox, then by a mirror 32y in direction Oy, as shown in FIG. 7. It then penetrates into the focussing optical system 35y.

On leaving cylinder 95, path 3z is parallel to the plane of FIG. 8 and is slanted with respect to the horizontal through an angle substantially equal to 120° and it is directed upwards of FIG. 8.

It is then directed downwards by a horizontal mirror 31z, as shown in FIG. 8, then, as shown in FIG. 6 and also in FIG. 9, it is directed by a mirror 32z in direction Oz. It then penetrates into the focussing optical system 35z.

FIG. 9 gives an overall view of the different paths 3x, 3y and 3z which the incident beam 3 may follow.

Figure 4:
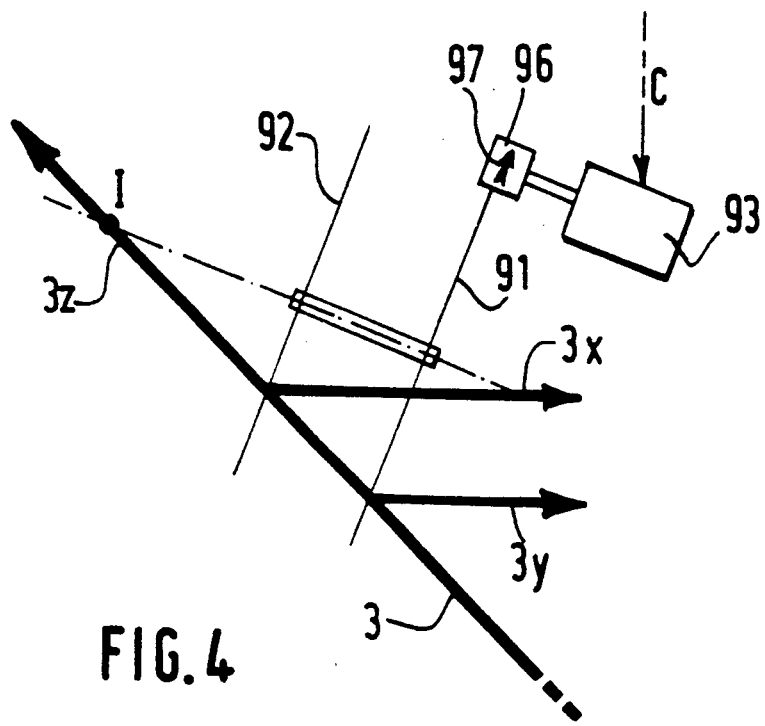
FIG. 4 shows a modification of the rotating disks of FIG. 3.

In FIG. 4, a variant of the device of FIG. 3 is shown in which the disks 91 and 92 are no longer the two bases of a single cylinder 95, but are separately supported by themselves. This embodiment is a little more difficult from the mechanical point of view, because the reflecting sectors each must remain strictly in the same plane when they rotate. However, it has the advantage of offering a better separation of paths 3x and 3y, in that they are spaced further apart than in the embodiment of FIG. 3. In fact, in the embodiment of FIG. 3, the refraction inside cylinder 95 tends to draw paths 3x and 3y together.

For the same reasons, in the case of FIG. 3, it is preferable to use zinc selenide as material for the cylinder 95, as it has an index of 2.4 which is lower than that of germanium which is equal to 4.

Naturally, although the anemometer of the invention proves particularly practical in the embodiment which has just been described, with three measurement directions, it is possible in some applications for a two-dimensional embodiment to be sufficient. In this case, it is obviously within the scope of a man skilled in the art to modify the anemometer which has just been described. For example, it is sufficient to provide on disk 91 sectors 910 and 911 of 180° each, to provide an entirely transparent base 92 for cylinder 95 and to omit mirrors 31x and 32x and the optical system 35x so as to obtain an anemometer with two measuring directions 3y and 3z.

Similarly, it is not obligatory to use, for intercepting the incident beam 3, disks with transparent and reflecting sectors driven in continuous rotation, like disks 91 and 92. Thus, any other interception devices could be used, for example partially transparent and partially reflecting flaps driven with a continuous oscillating movement, inside a fixed plane, for alternately reflecting and letting the beam pass, it being understood that this movement must occur perpendicularly to the beam, at the point where the latter is intercepted.

Naturally, when cylinder 95 is driven at 20 revolutions per second, each of the three components of the speed are obtained every 1/20 th of a second. When it is not necessary to know the speed variations at such a high rate, cylinder 95 may be driven at a slower speed.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. An apparatus for measuring its own speed of movement with respect to particles that are in suspension in ambient air, comprising:
    laser means for providing an incident beam selectively directed to said particles within a volume of the ambient air at a predetermined location so as to give rise to corresponding reflected beam;
    means for measuring a frequency deviation ($\Delta Fi$), related to said speed, between the respective frequencies of said reflected beam and said incident beam; and
    means for varying a direction along which said incident beam is selectively directed, to thereby select a different volume of ambient air to obtain a corresponding different frequency deviation,
    wherein said direction-varying means comprises means for intercepting said incident beam, said intercepting means including partially transparent and partially reflecting surface portions that are continuously moved in a selected plane, at a predetermined inclination to said incident beam at a point of interception, a direction of movement of said surface portions at said point of interception being perpendicular to said incident beam, said incident beam having its direction thereby selectively varied to be directed along at least two successive paths and means for controlling said measuring means and a movement of said intercepting means so that at least one frequency deviation measurement is made while said incident beam travels along each of said at least two successive paths.

2. Apparatus according to claim 1, wherein:
    said intercepting means comprises a first disk having a first axis which intersects a second axis along said incident beam, said first disk being driven in continuous rotation about said first axis and being provided with at least a first transparent sector and a first reflecting sector.

3. Apparatus according to claim 2, wherein:
    said first transparent sector is of 240° magnitude about said first axis, said first reflecting sector is of 120° magnitude about said first axis,
    said apparatus further comprising a second disk provided to rotate on the first axis with the first disk at a predetermined distance with respect thereto, said second disk intercepting sad incident beam after said incident beam has passed through said first transparent sector of said first disk, said second disk having a second transparent sector of 120° magnitude and a second reflecting sector of 120° magnitude which face said first transparent sector, said incident beam consequently following three successive paths (3z, 3x, 3y) after interacting with said sectors of said first and second rotating disks.

4. Apparatus according to claim 3, wherein:
    said first and second disks are respective bases of a cylinder made from a material transparent to a wavelength of said incident beam, said first and second reflecting sectors being obtained by depositing a reflecting material layer on the corresponding bases.

5. Apparatus according to claim 4, wherein:
    said first and second transparent sectors are provided with a blooming treatment.

6. Apparatus according to claim 4, wherein:
    said laser is an infrared laser and the material of said cylinder comprises one of germanium and zinc selenide.

7. Apparatus according to claim 3, wherein:
    reflecting means are provided in each of said three successive paths for directing beams received therealong into mutually orthogonal directions.

8. Apparatus according to claim 1, wherein:
    said partially reflecting surface portions are inclined with respect to said incident beam such that an angle formed by intersection of an axis of rotation of said partially reflecting surface and a direction of said incident beam is approximately 30°.

9. Apparatus according to claim 2, wherein:
said partially reflecting surface portions are inclined with respect to said incident beam such that an angle formed by intersection of an axis of rotation of said partially reflecting surface and a direction of said incident beam is approximately 30°.

10. Apparatus according to claim 3, wherein:
said partially reflecting surface portions are inclined with respect to said incident beam such that an angle formed by intersection of an axis of rotation of said partially reflecting surface and a direction of said incident beam is approximately 30°.

11. Apparatus according to claim 4, wherein:
said partially reflecting surface portions are inclined with respect to said incident beam such that an angle formed by intersection of an axis of rotation of said partially reflecting surface and a direction of said incident beam is approximately 30°.

12. Apparatus according to claim 5, wherein:
said partially reflecting surface portions are inclined with respect to said incident beam such that an angle formed by intersection of an axis of rotation of said partially reflecting surface and a direction of said incident beam is approximately 30°.

13. Apparatus according to claim 6, wherein:
said partially reflecting surface portions are inclined with respect to said incident beam such that an angle formed by intersection of an axis of rotation of said partially reflecting surface and a direction of said incident beam is approximately 30°.

* * * * *